United States Patent
Muthirisavenugopal et al.

(10) Patent No.: US 9,116,914 B1
(45) Date of Patent: Aug. 25, 2015

(54) DATA MIGRATION BETWEEN MULTIPLE TIERS IN A STORAGE SYSTEM USING POLICY BASED ILM FOR QOS

(75) Inventors: Vijayarankan Muthirisavenugopal, Newark, CA (US); Sharon Enoch, Newark, CA (US); Jomy Maliakal, Newark, CA (US); Paresh Chatterjee, Fremont, CA (US); Udita Chatterjee, legal representative, Kolkatta (IN)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 13/449,488

(22) Filed: Apr. 18, 2012

Related U.S. Application Data

(60) Provisional application No. 61/476,422, filed on Apr. 18, 2011.

(51) Int. Cl.
- *G06F 12/08* (2006.01)
- *G06F 3/0484* (2013.01)
- *G06F 17/30* (2006.01)
- *G06F 11/30* (2006.01)

(52) U.S. Cl.
CPC ...... *G06F 17/30221* (2013.01); *G06F 11/3048* (2013.01)

(58) Field of Classification Search
CPC ... G06F 3/0605; G06F 3/0616; G06F 3/0647; G06F 3/0689; G06F 11/3409; G06F 3/0649; G06F 3/067; G06F 9/4875; G06F 17/30221; G06F 11/3048; G06F 17/30082
See application file for complete search history.

(56) References Cited

U.S. PATENT DOCUMENTS

| | | | |
|---|---|---|---|
| 6,330,572 B1 * | 12/2001 | Sitka | 707/608 |
| 2007/0299959 A1 * | 12/2007 | Penny et al. | 709/223 |
| 2008/0104343 A1 | 5/2008 | Miyagaki et al. | |
| 2008/0270720 A1 * | 10/2008 | Tanabe et al. | 711/162 |
| 2009/0063765 A1 | 3/2009 | Kottomtharayil et al. | |
| 2011/0289287 A1 | 11/2011 | Yamamoto et al. | |

OTHER PUBLICATIONS

U.S. Appl. No. 13/449,478, filed Apr. 18, 2012, entitled "Data Migration Between Multiple Tiers in a Storage System Using Policy Based ILM for QOS," Inventors: Muthirisavenugopal et al.
ITL Education Limited, Introduction to Database Systems, Pearson Education India, Sep. 1, 2010, p. 222.

* cited by examiner

*Primary Examiner* — Cheng-Yuan Tseng
*Assistant Examiner* — Candice Rankin
(74) *Attorney, Agent, or Firm* — Meunier Carlin & Curfman LLC

(57) ABSTRACT

Technologies are described for implementing a default migration mechanism in a storage system containing multiple tiers of storage with each tier having different cost and performance parameters. Data that is accessed more frequently can be migrated toward higher performance storage tiers while data that is accessed less frequently can be migrated towards lower performance storage tiers. Default migration behavior can be overridden by user-specified values for tier age residency policy, demotion policy, tier occupancy of volumes, and tier assignment. Data migration can be paused by the user and resumed by the user.

20 Claims, 14 Drawing Sheets

| | BUCKET 0 1502 | BUCKET 1 1503 | BUCKET 2 1504 | BUCKET 3 1505 | BUCKET 4 1506 |
|---|---|---|---|---|---|
| TIER 0 1510 | 100 CELL 1550 | 30 CELL 1530 | 10 CELL 1538 | 170 CELL 1540 | 20 CELL 1542 |
| TIER 1 1511 | 150 CELL 1551 | 0 CELL 1554 | 40 CELL 1532 | 50 CELL 1544 | 10 CELL 1546 |
| TIER 2 1512 | 200 CELL 1552 | 120 CELL 1556 | 30 | 235 CELL 1534 | 40 CELL 1548 |
| TIER 3 1513 | 100 CELL 1553 | 0 | 100 | 300 | 400 CELL 1536 |

DATA MIGRATION BETWEEN MULTIPLE TIERS IN A STORAGE SYSTEM USING POLICY BASED ILM FOR QOS

CROSS-REFERENCE TO RELATED APPLICATIONS

This application claims the benefit of U.S. provisional patent application No. 61/476,422, filed on Apr. 18, 2011, and entitled "Data Migration Between Multiple Tiers in a Storage System Using Policy Based ILM for QOS" which is expressly incorporated herein by reference in its entirety.

BACKGROUND

A virtualized cluster is a cluster of different storage nodes that together expose a single storage device. Input/output (I/O) operations sent to the cluster are internally re-routed to read and write data to the appropriate locations. In this regard, a virtualized cluster of storage nodes can be considered analogous to collection of disks in a Redundant Array of Inexpensive Disks (RAID) configuration, since a virtualized cluster hides the internal details of the cluster's operation from initiators and presents a unified device instead.

In a virtualized cluster, which may have huge amounts of storage, the drives and RAID arrays constituting the storage hardware may not be homogeneous. A combination of less expensive, slower drives and more expensive, faster drives are often used together to achieve a desired mix of performance and price. Such a homogeneous storage system consists, therefore, of a plurality of sets of physical disks or logical disks, each set having different cost and performance parameters. Determining how the data being stored in the system should best be distributed among the various drives presents an interesting challenge. Generally, two major considerations play into making such a determination. These considerations are performance maximization and utilization maximization of the most costly resources.

Just as the disk and logical disk components of a storage system may not be homogeneous, data accesses in the system may not be homogeneous. Generally, certain data may be accessed very frequently while other data may be hardly ever accessed. Moreover, some data may have been accessed frequently at some point in time, but has recently been accessed less frequently. It is typically desirable to host data that is accessed more frequently on the higher cost, higher performance storage devices. Conversely, data that is less frequently accessed may be relegated to the lower cost, lower performance storage devices. Such an arrangement may provide a storage system that puts the most costly resources to their highest and best use.

Migrating blocks of stored data to different storage areas over time can assist with placing the most used data on the highest performance storage components. Determining which data should be migrated to what storage areas and at what time can provide a difficult optimization challenge. This challenge is further complicated by the fact that data access patterns may change over time and are generally not static.

It is with respect to these considerations and others that the disclosure made herein is presented.

SUMMARY

Technologies are described herein for implementing a migration mechanism in a storage system containing multiple tiers of storage with each tier having different cost and performance parameters to obtain a desired quality of service. Quality of service is the ability to provide different priority to different applications, users, or data flows, or to guarantee a certain level of performance to a data flow. Through the utilization of the technologies and concepts presented herein, data that is accessed more frequently can be migrated toward higher cost, higher performance storage tiers while data that is accessed less frequently can be migrated towards lower cost, lower performance storage tiers. A dynamic, adaptive approach can provide a highly optimized arrangement of data. Such an approach can also attempt to maintain efficient data arrangements amongst the tiers of the storage system even under changing data access conditions. The capacity within a storage system can be partitioned into sets, each set having different cost and performance parameters. These sets can be referred to as the tiers of the storage system. A storage system with more than one tier can be referred to as tiered storage.

Information Lifecycle Management (ILM) statistics can be collected for each segment, or storage entity, within the storage system. Storage entities may be territories, files, blocks, sectors, tracks, stripes, or any other data storage subdivision. For example, the entire storage space in the system may be divided up into multiple segments called territories. Examples of ILM statistics that can be maintained for each territory may include frequency of access and age, or time since last access.

Techniques for combining frequency and age statistics into a single ILM metric may be used to simplify other aspects of the data migration system. The ILM metric can be a single, signed number, with positive numbers representing frequency and negative numbers representing age. These metrics may be analyzed periodically to determine which data migration moves should be made in order to optimally place data within the storage system.

Placement of data may be governed first by the promotion of territories with higher access frequency to higher tiers. Data migration may be governed by demoting territories to lower tiers to create room for the promotion of more eligible territories from the next lower tier. In instances where space is not available on the next lower tier, further demotion may take place from that tier to an even lower tier in order to make space for the previously discussed demotion. In this manner, the data may be optimally arranged for improved performance, and the system can also respond to dynamically changing patterns in data access.

The above described automated techniques can move data intelligently across tiers during low activity periods. However, there may be some cases in which a user such as an IT administrator may want to tune these policies to address the needs of the working environment or to obtain a desired quality of service. For example, some companies may store both frequently accessed and stale data in expensive high performance and highly redundant tiers due to the nature of the data stored.

A policy can be defined by a user to demote territories above a configurable age to the next lower tier depending on the space available in the lower tier. A policy can be defined by a user to demote territories when a configurable percentage of the tier is full. Territories can be distributed across tiers based on the age of the territory, assigning user-specified ratios or proportions in which data occupies each tier. Default policy for deciding the tier on which a logical drive resides based on RAID level, disk type, number of drives and number of spares can be modified by a user-defined tier to which a specified logical drive is assigned, enabling differentiation between tiers that by default are categorized at the same level.

The ability to pause and resume activities is provided for any particular container at any particular point in time.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
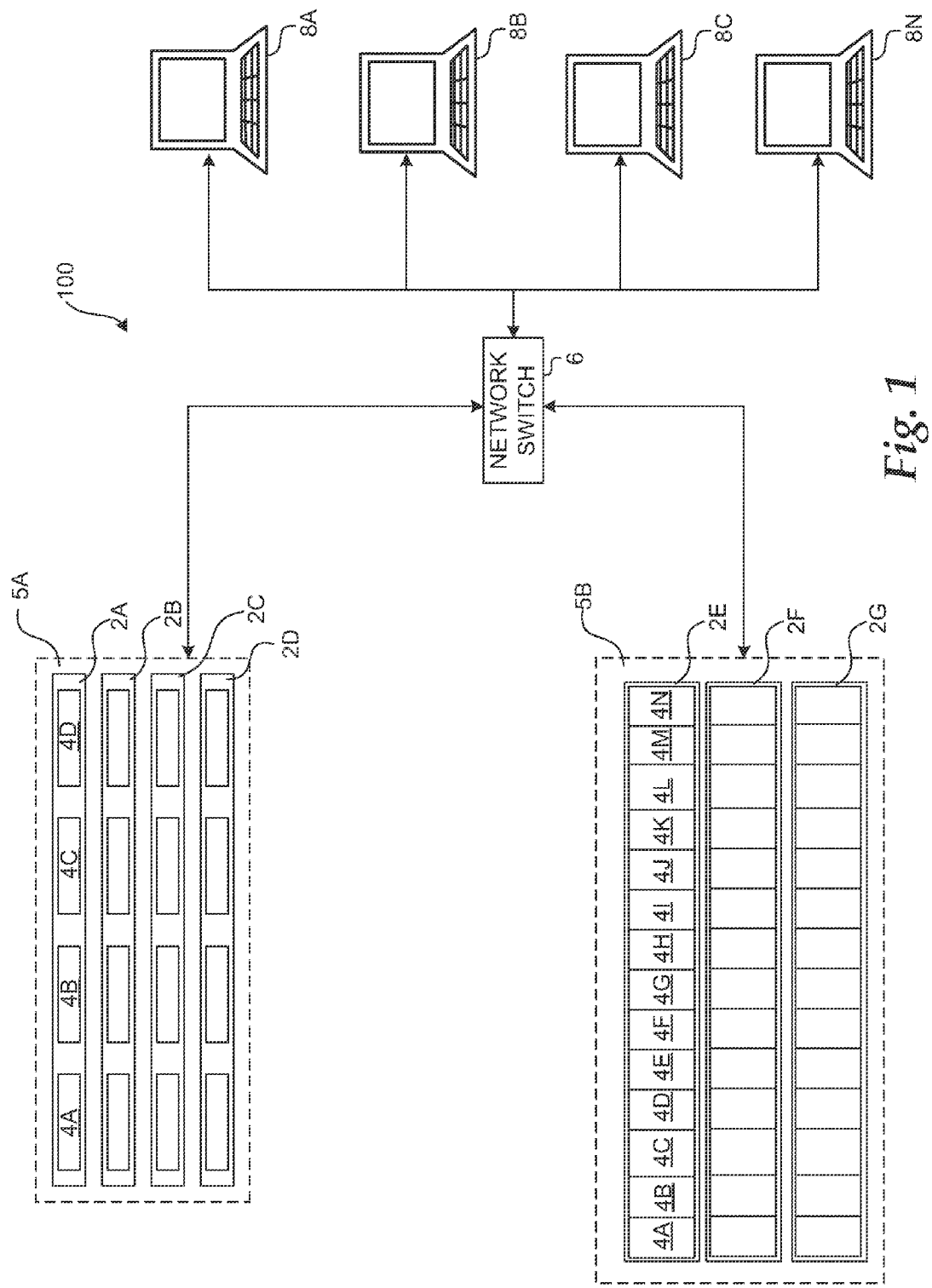
FIG. 1 is a network architecture diagram illustrating aspects of a storage system that includes several virtualized clusters according to one exemplary embodiment.

The following detailed description is directed to implementing data migration in a multitier storage system using user-specified policies: tier age residency or demotion policies and tuning default tier age residency policies, tier occupancy of volumes, tier assignment and pause and resume data movement.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for implementing data migration in a multitier storage system using age and frequency statistics will be described.

Turning now to FIG. 1, details will be provided regarding an illustrative operating environment for the implementations presented herein, as well as aspects of several software components that provide the functionality described herein for implementing data migration in a multitier storage system using user-specified policies. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Figure 2:
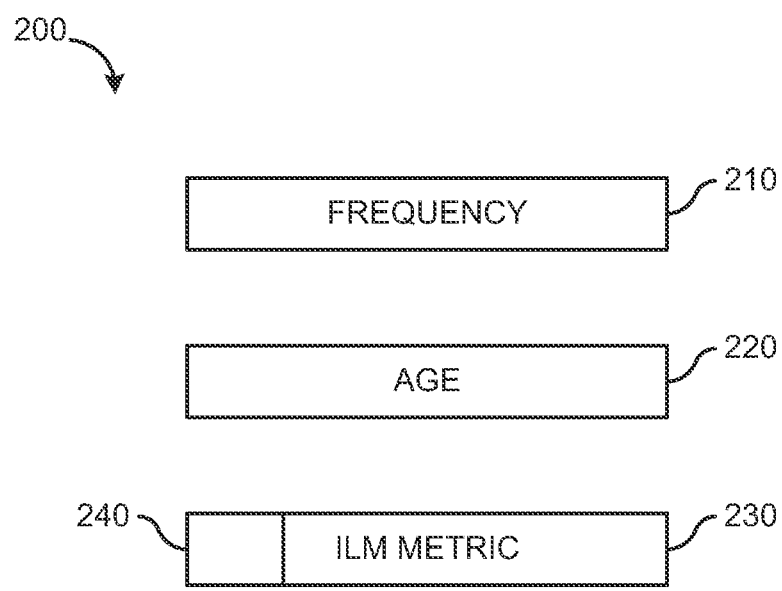
FIG. 2 is a data structure diagram illustrating ILM statistics variables according to one exemplary embodiment.

Referring now to FIG. 2, a data structure diagram 200 illustrates ILM statistics variables according to one exemplary embodiment. To determine how frequently a territory is accessed, a frequency statistic 210 can be maintained. If a territory was accessed during the last update period, the frequency statistic 210 can be incremented each time the territory is accessed. At the end of an update period, the frequency statistic 210 can represent the number of accesses during that update period. A second ILM statistic may be an age statistic 220. If a territory was not accessed during the last update period, the age statistic 220 may be incremented to indicate that is has been a longer time since the territory was accessed. Although storage entities of territories are discussed, a storage entity may be a file, block, sector, stripe, provision, or any other subdivision of a physical storage device.

The update period may be any consistent amount of time. The update period may be established by a counter, clock, timer, timer interrupt, or any other time keeping mechanism. Such a mechanism can cause a process, module, or thread to update all of the ILM statistics once per update period. An example of an update period may be one hour, but other time durations can equally be used.

A combined single variable can be used as an ILM metric 230 which can represent both the frequency statistic 210 and the age statistic 220 within one value. The frequency statistic 210 and the age statistic 220 may be considered mutually exclusive since the frequency statistic 210 may be irrelevant for a territory with a higher age, and the age statistic 220 may be taken as zero, or nearly zero, for a frequently accessed territory. Thus only one of the frequency or the age needs to be stored for a given territory. The sign bit 240, or the most significant bit, of the ILM metric 230 variable may be used to indicate whether the ILM metric 230 is currently an age or a frequency. The ILM metric 230 can represent a signed value, which can be negative when it represents an age, and positive when it represents a frequency. A larger positive number can imply a higher frequency of access than a lower positive number, while a lower (or more negative) negative number can imply an older age then a smaller negative number, thus a consistent continuum across the positive and negative ILM metric 230 values can represent a consistent ordering. This order maps to both most recently and most frequently accessed territories having higher ILM metric 230 values.

An example of implementing the ILM metric 230 values may be to use a 16 bit word to store the ILM metric 230. To remove ambiguity, unused territories or newly initialized ILM metrics 230 may be given the unique value with all bits set high. This number will not be used in the normal age or frequency counting operations in order to maintain its unique meaning in an unambiguous manner. Other than this reserved identifier, the high bit (or sign bit) can be used to designate age or frequency such that ages are negative and frequencies are positive. The remaining fifteen bits are used to count the age and/or frequency accordingly.

Further detail will be discussed below to illustrate how ILM statistics 230 can be periodically updated. Also, the use of the combined ILM statistics 230 to improve the efficiency of migration techniques is demonstrated below in additional detail.

Figure 3:
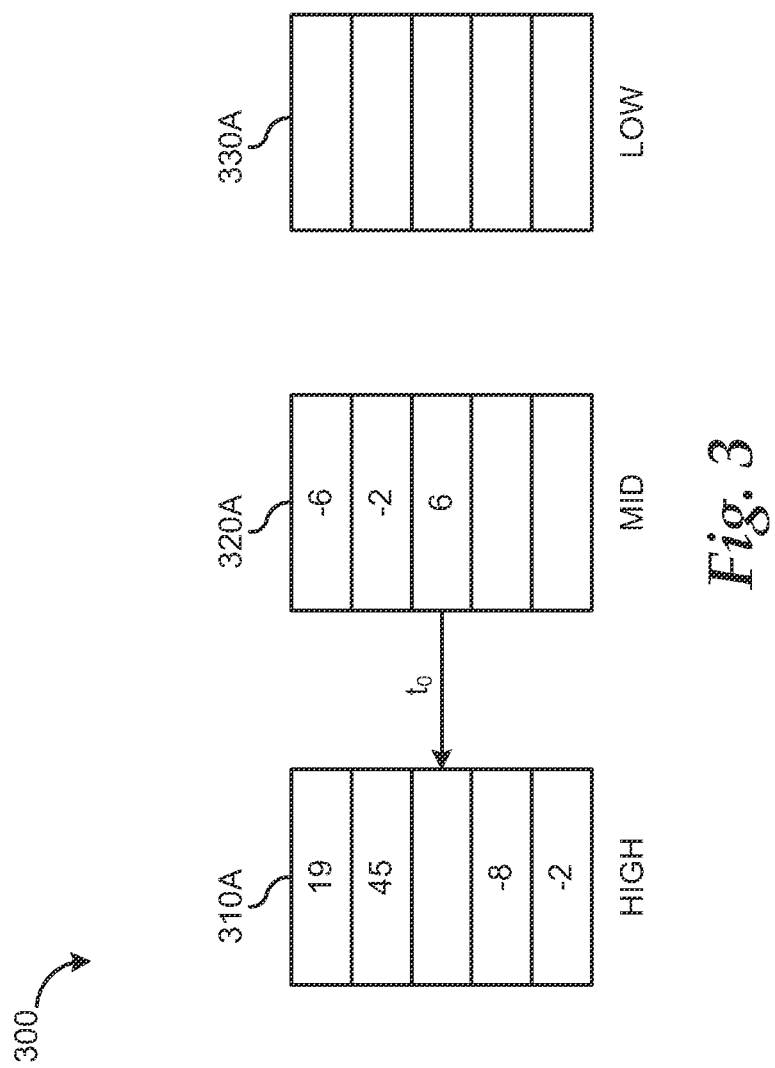
FIG. 3 is a data structure diagram illustrating a first phase of data migrations according to one exemplary embodiment.

Referring now to FIG. 3, a data structure diagram 300 illustrates a first phase of data migrations. A storage system can comprise three tiers, a high-performance tier 310A, a middle tier 320A, and a low-performance tier 330A. Each tier can have a corresponding array, list, or other data structure where each element of the data structure can store an ILM metric corresponding to each territory or similar data storage subdivision.

The subdivisions of a tier may be territories of the storage system. While smaller territories may provide a finer granularity of statistics, larger territories may provide a reduced memory/storage footprint for the statistics being collected. A tradeoff between these two constraints may yield an optimal territory size for different applications or systems. For example, one embodiment may use a territory size of eight megabytes.

Placement of data in the tiers may be driven by the following criteria, in order of highest priority first. The first priority can relate to the highest utilization of the high-performance tier. All data can be given the opportunity to reside on high-performance storage if space is available. Since a greater amount of money may have been invested in the purchase of the high-performance storage, it can be a waste of resources to leave portions of the higher tiers idle. The second priority can relate to utilization of high-performance storage for data that may be accessed more frequently. If there is contention for high-performance storage, the most frequently accessed data can be given priority for the high-performance storage. The third priority can relate to utilization of low-performance storage for data that may be accessed less frequently. If less frequently accessed data is occupying high-performance storage, it can be moved to a lower performance tier in order to free up space in the high-performance tier for more frequently accessed data. While an example data migration scheme can be expressed as three migration phases and in the context of three storage priorities, the scheme can be partitioned into more or fewer phases without departing from the spirit or scope of the technologies discussed herein.

From the three priorities, certain corollaries may result. First, new data, or storage allocations, can be automatically placed on the highest available tier. That is, when a new write arrives to the system, it can automatically be routed to the highest available tier. Second, if there is space available on a high-performance tier, the most eligible candidate territory from a lower tier can be moved to the higher tier. Third, if there is no space available on a high-performance tier, but there are candidate territories on lower tiers that are more eligible to reside on the higher tier than the territories currently residing on the higher tier, the most ineligible territories can be demoted out of the higher tier and into a lower tier. This demotion may make space for the promotions of more eligible territories into the higher tier.

For simplicity, movement of territories may be restricted to only occur between adjacent tiers. For example, in a storage system with three tiers (high, middle, and low) movement may only be allowed to occur from the high tier to the middle tier, from the middle tier to either the low tier or the high tier, and from the low tier to the middle tier. Of course the data migration system can be implemented without such a single-hop restriction, but additional complexity may result.

Data migration processes may include the following operations. Data having the highest access frequencies, along with all newly arriving data, can be stored in the tier with the highest performance that has free territories. If a higher tier is nearly full, and is found to have elements that are less eligible than elements in a lower tier, these less eligible elements can be demoted to a lower tier to create space for the more eligible territories to be promoted. When space is not available for such demotion to the lower tier, the least eligible data in the lower tier can be demoted to an even lower tier in anticipation of the eventual promotion of more eligible data to the higher tier. In the steady state, the entire amount of stored data can be striped across multiple tiers so that the highest performance tiers have the most frequently accessed data, the lower tiers have the least accessed data, and utilization of the costliest resources is substantially maximized.

In the example illustrated in FIG. 3, the third territory of the middle tier 320A has the highest ILM metric of the tier with a frequency of six. As such, that territory can be migrated to the empty space in the high tier 310A. Since the target territory is empty, the promotion can be made immediately, or in time t_zero. Promoting the most eligible territory into free space in a higher tier is an example of priority one data migrations.

Migrating data can involve copying all of the data from the source territory to the target territory in a different tier. The ILM statistics in the tier data structures must also be migrated to correspond to the new location of the migrated territory.

As one example, a storage system may have three tiers where the top tier comprises high-performance SAS (serially attached SCSI) drives; the middle tier comprises slower SATA (serial advanced technology attachment) drives with a high-performance RAID system; and the low tier comprises SATA drives with a slower RAID system. Factors in determining the tiers may include drive rotation speed, head seek latency, drive interface performance, caching, RAID performance, drive capacity, network connection speed, network stack performance, and various other system parameters.

Figure 4:
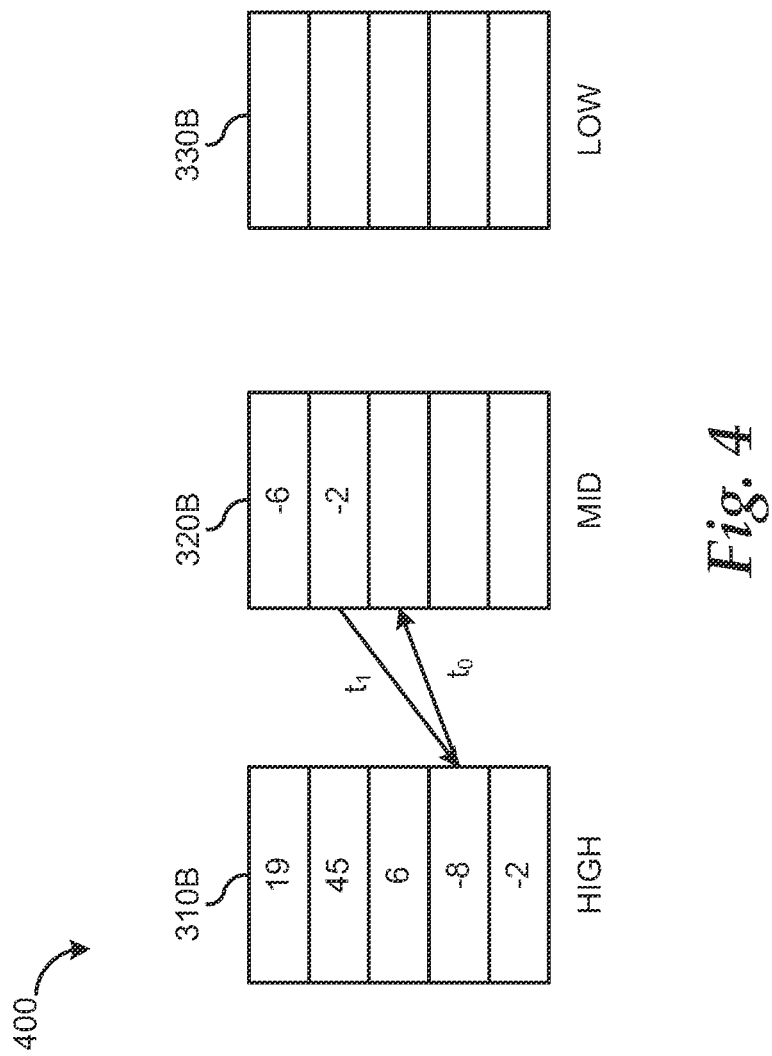
FIG. 4 is a data structure diagram illustrating a second phase of data migrations according to one exemplary embodiment.

Referring now to FIG. 4, a data structure diagram 400 illustrates a second phase of data migrations. A storage system can comprise three tiers, a high-performance tier 310B, a middle tier 320B, and a low-performance tier 330B. Three data structures can comprise elements that can each store an ILM metric corresponding to a subdivision, or territory, of the data store.

Data migrations can be based upon relative eligibility. For example, a territory in the high tier 310B having a lower ILM metric than the highest territory in the middle tier 320B may imply an eligibility gap or non-optimal arrangement of data. The highest territory of the middle tier 320B is the second territory and has an ILM metric of negative two. The fourth territory of the high tier 310B has an ILM metric of negative eight. Since negative two is greater than negative eight, the second territory of the middle tier 320B can be said to be more eligible to be in the high tier 310B. Likewise, the fourth territory of the high tier 310B, having the lower ILM metric of negative eight, can be said to be less eligible to be in the high tier 310B. If space permits, less eligible tiers can be demoted to the next lower tier. In this instance, the fourth territory of the high tier 310B having an ILM metric of negative eight can be demoted to the middle tier 320B. This can be done to support migrating more eligible data from the middle tier 320B into the space created by the demotion. In this case, it would open up a space in the high tier 310B into which the second territory of the middle tier 320B could be promoted. Such a demotion to clear space for promotions is an example of priority two data migrations.

Generally, demotions have to occur first. Preferably, they can occur immediately in time period t_zero. After space is made in the high tier 310B by the demotion, the corresponding promotion from the middle tier 320B may occur in the next time period or at time t_one. The time periods may be defined by periodic timed migration cycles within the storage system. Also, multiple migration phases or time cycles may occur within a single cycle of the migration period timer.

The demotions for priority two data migrations can be performed pair-wise between tiers. The demotions can start with the lowest two tiers so that space is created as less eligible territories are demoted down the hierarchy of tiers. The demotions can also start with the highest two tiers. Either way, the pairing of tiers for demotion can iterate pair-wise through the entire set of tiers. For example, the three tiers of the example system illustrated in FIG. 4 can have two iterations of paired tiers, high tier to middle tier, and middle tier to low tier.

The number of demotions may be limited to only the number required to make space for the promotion of more eligible territories. As such, the process of demotion and promotion can be considered a swapping of territories between two tiers. Hence, less eligible candidates in the higher tier can be matched up to the more eligible candidates in the lower tier. The number of territories to demote can be calculated as the minimum of three numbers: the number of less eligible candidates in the higher tier, the number of more eligible candidates in the lower tier, and the number of free space in the lower tier to support demotions from the higher tier.

Figure 5:
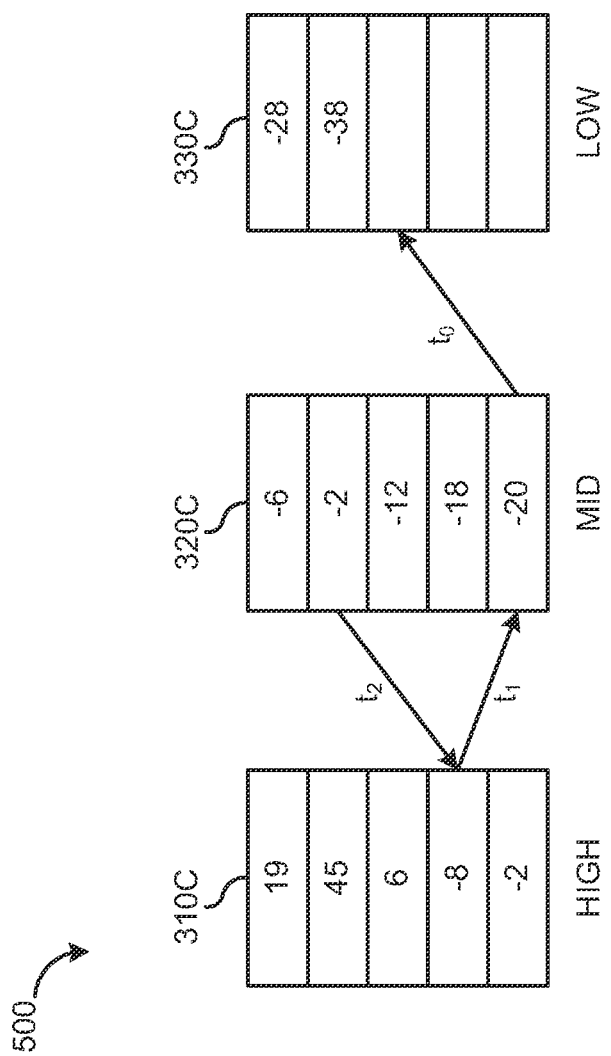
FIG. 5 is a data structure diagram illustrating a third phase of data migrations according to one exemplary embodiment.

Referring now to FIG. 5, a data structure diagram 500 illustrates a third phase of data migrations. A storage system can comprise three tiers, a high-performance tier 310C, a middle tier 320C, and a low-performance tier 330C. Three data structures can comprise elements that can each store an ILM metric corresponding to a subdivision, or territory, of the data store. Using the priority two data migration discussed above, the fourth territory of the high tier 310C may be demoted to make room for the second territory of the middle tier 320C to be promoted to the high tier 310C. This may be an optimizing migration because the second territory of the middle tier 320C has an ILM metric of negative two which is higher than the negative eight ILM metric of the fourth territory of the high tier 310C. Thus the second territory of the middle tier 320C can be said to be more eligible to be in the high tier 310C than the fourth territory of the high tier 310C. Unfortunately, if the middle tier 320C is full, then the demotion is blocked which then also prevents the promotion.

Creating a space on the middle tier 320C by demoting the lowest territory in the middle tier 320C can allow the demotion from the high tier 310C and subsequently the promotion from the middle tier 320C to take place. This can be an example of priority three data migration. The fifth territory of the middle tier 320C may be selected for demotion due to it having the lowest ILM metric of the tier at negative twenty. Since there is room on the low tier 330C, the fifth territory of the middle tier 320C can be immediately demoted into the low tier 330C. This can occur in time period t_zero. The space created by that demotion can then allow for the demotion of the fourth territory of the high tier 310C with an ILM metric of negative eight into the middle tier 320C. This second demotion can occur after time period t_zero, such as in time period t_one. The space created by that demotion can then allow for the promotion of the second territory of the middle tier 320C with an ILM metric of negative two into the high tier 310C. This promotion can occur after the two demotions, which can be in time period t_two if the second demotion occurred in time period t_one.

Priority three migrations can be considered to occur between trios, or triples, of consecutive tiers. The process can continue piece-wise across all tiers by advancing, by one tier at a time, the current trio of tiers to operate upon. The process can begin with the lowest three tiers as the current trio to allow for the creation of space as territories are demoted down the hierarchy of tiers. Also, the process can begin at the highest trio of tiers. The general progression can provide for determining when no space is available in the middle tier of the trio. In response, space can be created on the middle tier of the trio by demoting the least eligible tier of the middle tier of the trio to the lower tier of the trio. A territory from the upper tier of the trio can then be demoted into the space left behind on the middle tier of the trio. Finally, the most eligible territory in the middle tier of the trio can be promoted to the upper tier of the trio.

Figure 6:
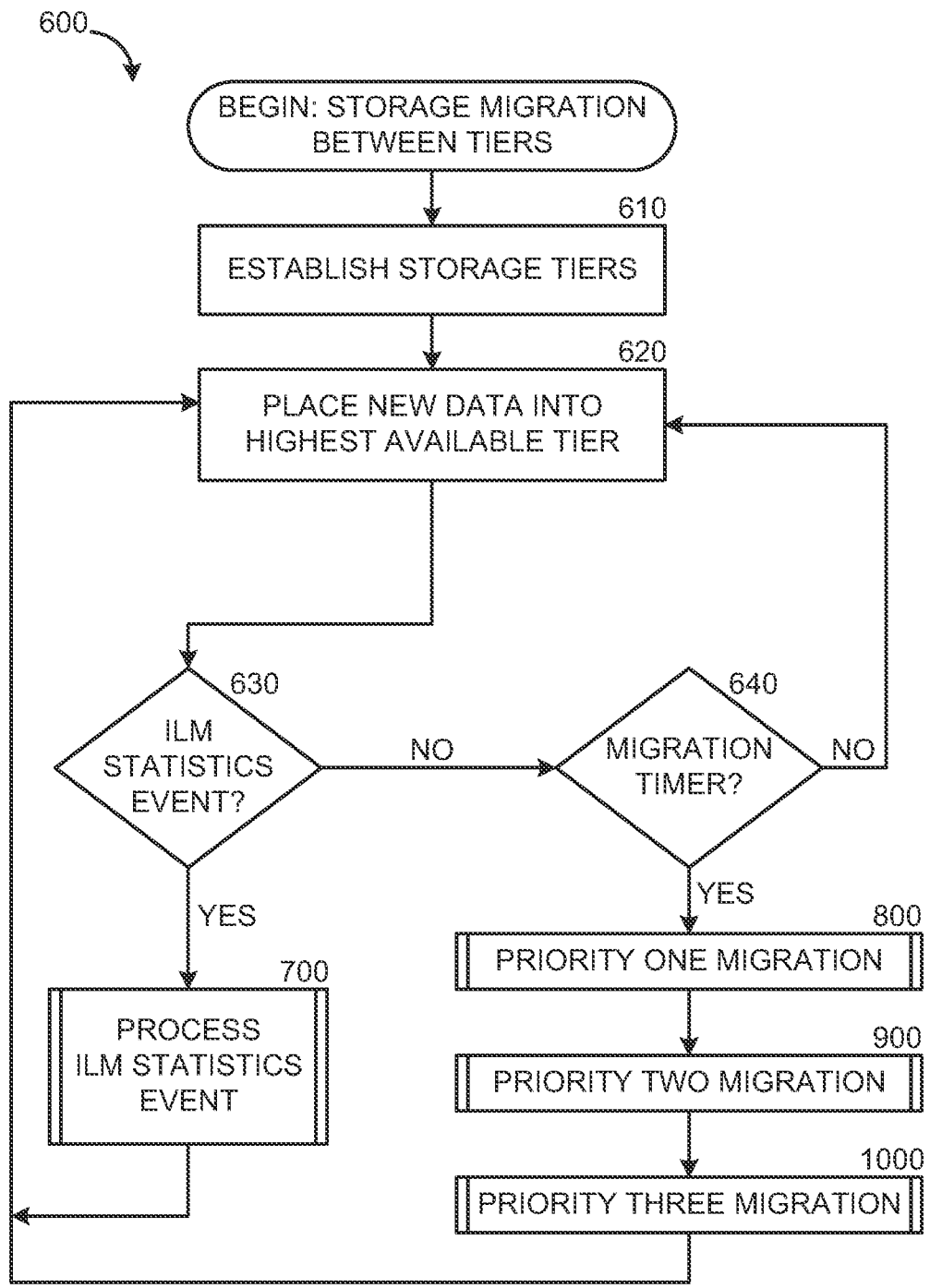
FIG. 6 is a logical flow diagram illustrating a process performed by a storage system for migrating data between storage tiers according to one exemplary embodiment.

Turning now to FIG. 6, additional details will be provided regarding the embodiments presented herein for data migration in a multitier storage system using age and frequency statistics. In particular, FIG. 6 is a flow diagram showing a routine 600 that illustrates aspects of an exemplary process performed by a storage system for migrating data between storage tiers. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 600 can begin with operation 610 where storage tiers can be established. Factors in determining the tiers can be related to the performance of the various storage devices in the system. These factors may include drive rotation speed, head seek latency, drive interface performance, caching, RAID performance, drive capacity, network connection speed, network stack performance, and various other parameters.

At operation 620, new data arriving to the storage system is placed into the highest available tier. Operation 620 may be included into a continuous main loop of the routine 600 so that at all times newly arriving data is placed into the highest tier with free space available.

At operation 630, it is evaluated if an ILM statistic event has occurred. If no ILM statistic even has occurred, the main loop of the routine 600 can continue to operation 640. If an ILM statistic event has occurred, the routine 600 can proceed to subroutine 700 to process the ILM statistic event. The ILM statistics event processing routine 700 is discussed in additional detail with respect to FIG. 7. After operation 700, the routine 600 can loop back to operation 620.

At operation 640, it is evaluated if a periodic migration timer event has occurred. If no migration time event has occurred, the main loop of the routine 600 can continue back to operation 620. If a migration time event has occurred, the routine 600 can continue to subroutine 800 where priority one data migrations can be performed, and then to subroutine 900 where priority two data migrations can be performed, and finally to subroutine 1000 where priority three data migrations can be performed. The data migration routines 800, 900, and 1000 are discussed in additional detail with respect to FIGS. 8, 9, and 10 respectively. After operation 1000, the routine 600 can loop back to operation 620.

Performing data migration may consume considerable computational, time, memory, or communications resources within the storage system. In order to limit this resource consumption, a quota or ceiling may be imposed on the number of data migrations than can occur per migration cycle or within a given period of time. This quota checking can prevent additional migrations past the limit from occurring. Such limiting may be imposed within routine 600. The limitations may also be checked and imposed within one or more of routine 700, 800, 900, or 1000.

Figure 7:
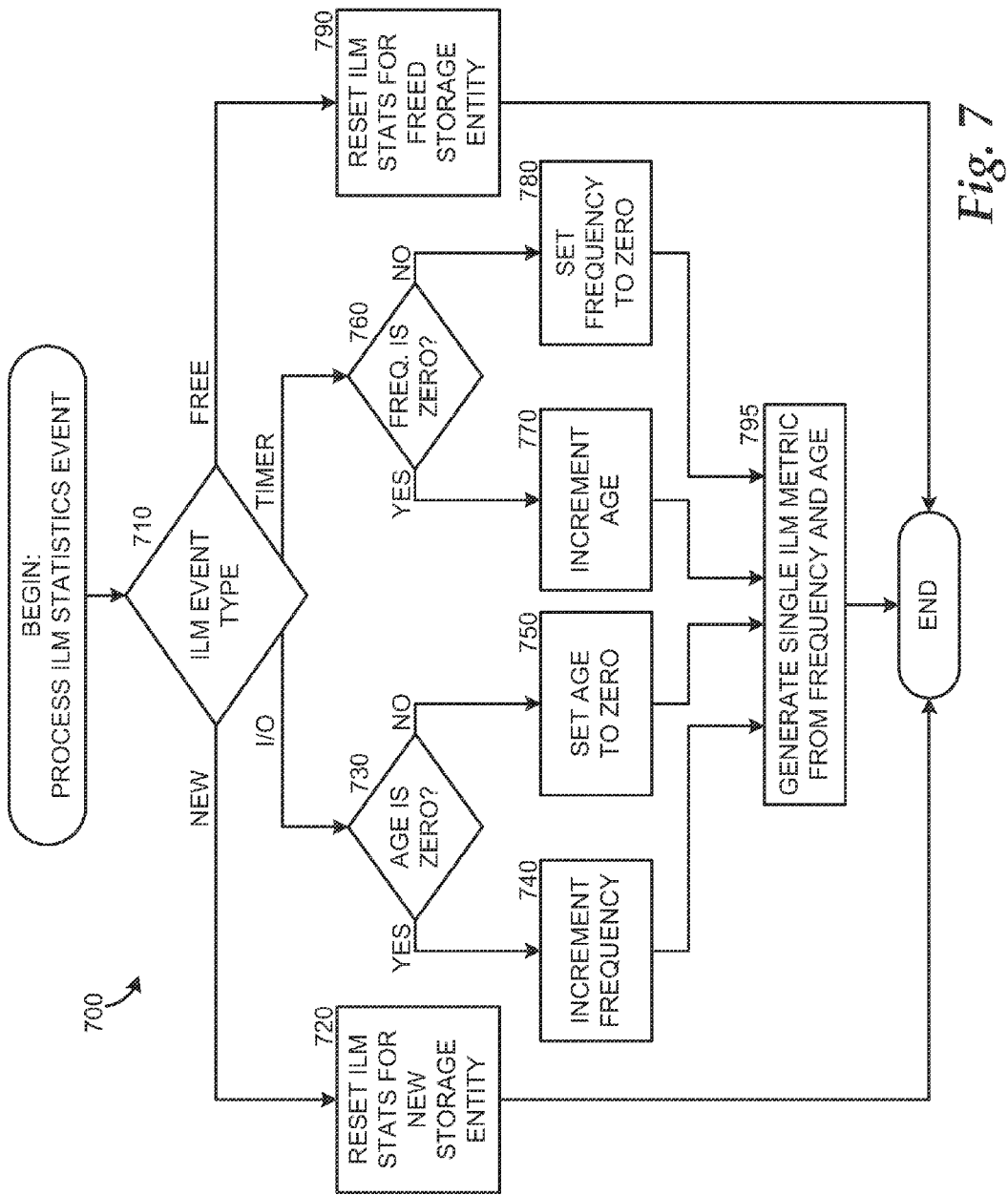
FIG. 7 is a logical flow diagram illustrating a process performed by a storage system for processing an ILM statistics event according to one exemplary embodiment.

Turning now to FIG. 7, additional details will be provided regarding the embodiments presented herein for data migration in a multitier storage system using age and frequency statistics. In particular, FIG. 7 is a flow diagram illustrating a routine 700 that shows aspects of an exemplary process performed by a storage system for processing an ILM statistics event. The routine 700 can begin with operation 710 where it is determined what type of ILM event has occurred. If a new storage entity, or territory, is added to the storage system, the routine 700 can continue from operation 710 to operation 720. If an I/O has occurred requiring the updating of ILM statistics, the routine 700 can continue from operation 710 to operation 730. If the timer for updating ILM statistics has triggered an ILM event, the routine 700 can continue from operation 710 to operation 760. If a storage entity, or territory, has been freed, the routine 700 can continue from operation 710 to operation 790.

At operation 720, the ILM statistics for a new storage entity, or territory, can be initialized to indicate that the territory is not being used. For example, a system using 16 bit ILM statistics may initialize ILM statistics values to 0xFFFF to represent that the territory is not allocated. In reserving the value 0xFFFF for initialization, the value will not be used to indicate an age or frequency.

At operation 730, it is determined if the age of the territory is zero. If the age is zero, the routine 700 can continue to operation 740 where the frequency can be incremented. When an I/O to a territory completes, the age of the territory can be zero and the frequency can be incremented. The frequency can be considered the number of I/Os that have hit that territory in during the last ILM update timer period. There may be a maximum frequency beyond which the frequency is no longer incremented. For example, a system using 16 bit ILM statistics may only increment the frequency to a maximum of 0xFFFE since the ILM statistic value of 0xFFFF may indicate the initialized, unallocated state. If operation 730 instead determines that the age of the territory is not zero, the routine 700 can proceed to operation 750 where the age is set to zero. The age of a territory can be the number of ILM update timer periods since the last I/O within the given territory occurred. An ILM update timer period may be, for example, one hour, or any other time period according to embodiments.

At operation 760, it is determined if the frequency of the territory is zero. If the frequency is zero, the routine 700 can continue to operation 770 where the age can be incremented. When an ILM update timer event occurs, the age of the territory can be incremented and the frequency set to zero. The frequency can be considered the number of I/Os that have hit that territory in during the last ILM update timer period. There may be a maximum age beyond which the age is no longer incremented. For example, a system using 16 bit ILM statistics may only increment the age to a maximum of 0xFFFE since the ILM statistic value of 0xFFFF may indicate the initialized, unallocated state. If operation 760 instead determines that the frequency of the territory is not zero, the routine 700 can proceed to operation 780 where the frequency is set to zero. The age of a territory can be the number of ILM update timer periods since the last I/O within the given territory occurred. An ILM update timer period may be, for example, one hour, or any other time period according to embodiments.

Operation 795 may follow after operations 740, 750, 770, or 780. When the ILM statistics for age, frequency, or both are updated, operation 795 can process the age and frequency statistics together into a single signed value to form an ILM metric. The routine 700 can terminate after operation 795.

At operation 790, the ILM statistics can be reset. When a storage territory is freed or released back to the unused storage pool, the statistics can be reset to the initialized value. For example, a system using 16 bit ILM statistics may reset to the initialized values of 0xFFFF to represent that the territory is no longer allocated. The routine 700 can terminate after operation 790.

Figure 8:
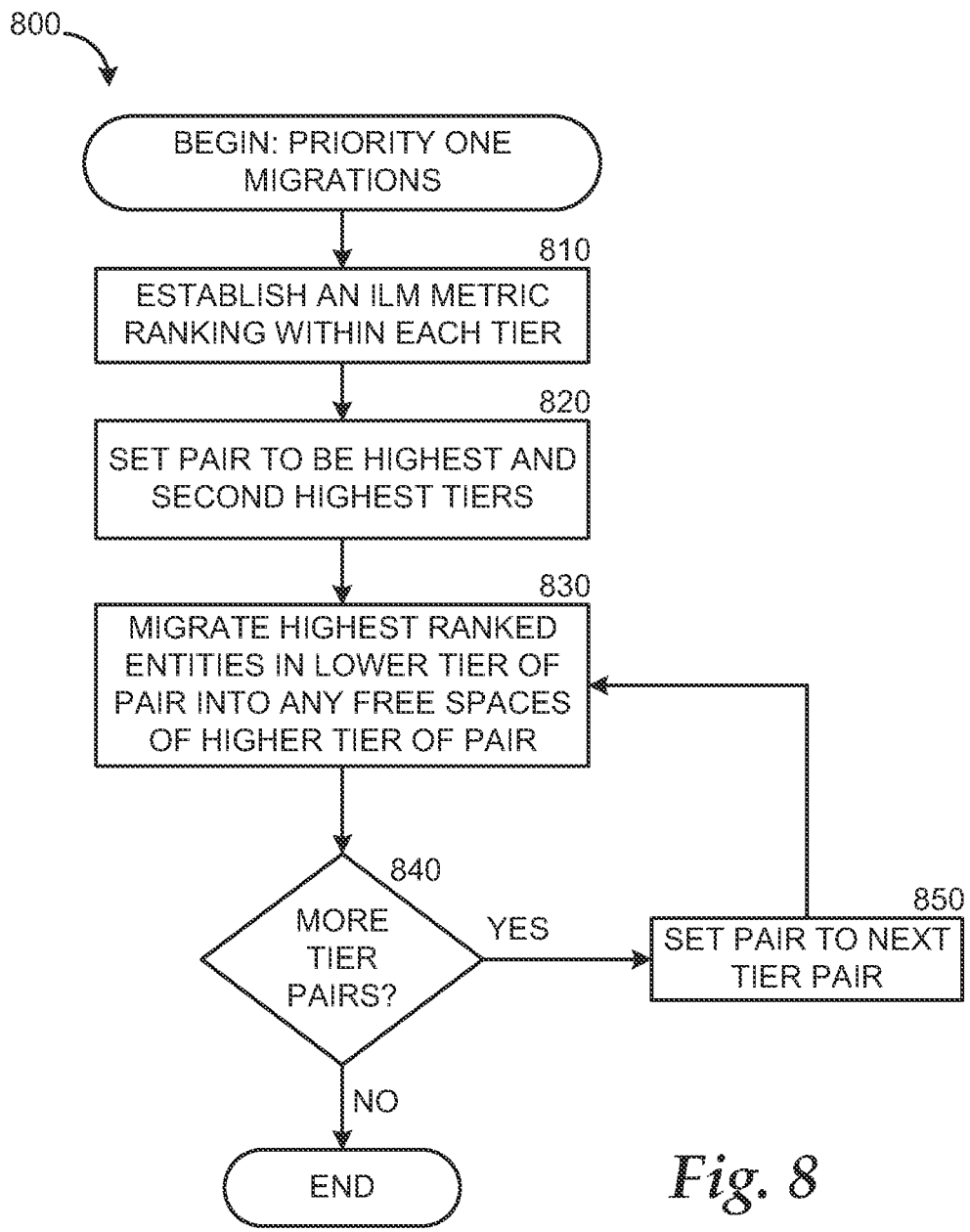
FIG. 8 is a logical flow diagram illustrating a process performed by a storage system for priority one data migrations according to one exemplary embodiment.

Turning now to FIG. 8, additional details will be provided regarding the embodiments presented herein for data migration in a multitier storage system using age and frequency statistics. In particular, FIG. 8 is a flow diagram illustrating a routine 800 that shows aspects of an exemplary process performed by a storage system for performing priority one data migrations. The routine 800 can begin with operation 810 where the territories within each tier are sorted by their ILM metric to provide a ranking of the territories within each tier by ILM metric. This sorting may be used to determine which territories of a given tier are more eligible than territories in the next higher tier or less eligible than the territories in the next lower tier.

At operation 820, a pair of tiers to evaluate is initialized as the two highest tiers within the storage system. At operation 830, the current pair of tiers can be evaluated. This evaluation involves looking at the highest territories in the lower tier to see if any of them have higher ILM metrics than the lowest ILM metric in the higher tier of the pair. If one or more territories in the lower tier meet this criterion, they can be said to be more eligible to be in the higher tier. If there are territories in the lower tier of the pair that are more eligible and the higher tier has open space, the more eligible territories can be migrated from the lower tier of the pair to the high tier of the pair. Such migration to a higher tier can be referred to as promotion.

At operation 840 it can be determined if there are more pairs of neighboring tiers to be evaluated for migration. If there are more tiers, the routine 800 can proceed to operation 850 where the current pair of tiers to evaluate is advanced to the next pair of tiers. This pair advance can include setting the current lower tier to be the new higher tier and setting the tier below the current lower tier to be the new lower tier. From operation 850, the routine 800 can loop back to operation 830 where the newly advanced pair of tiers may be evaluated for possible promotion of more eligible territories as described above. If instead, it is determined at operation 840 that there are no more pairs of tiers to evaluate, the routine 800 can terminate.

Figure 9:
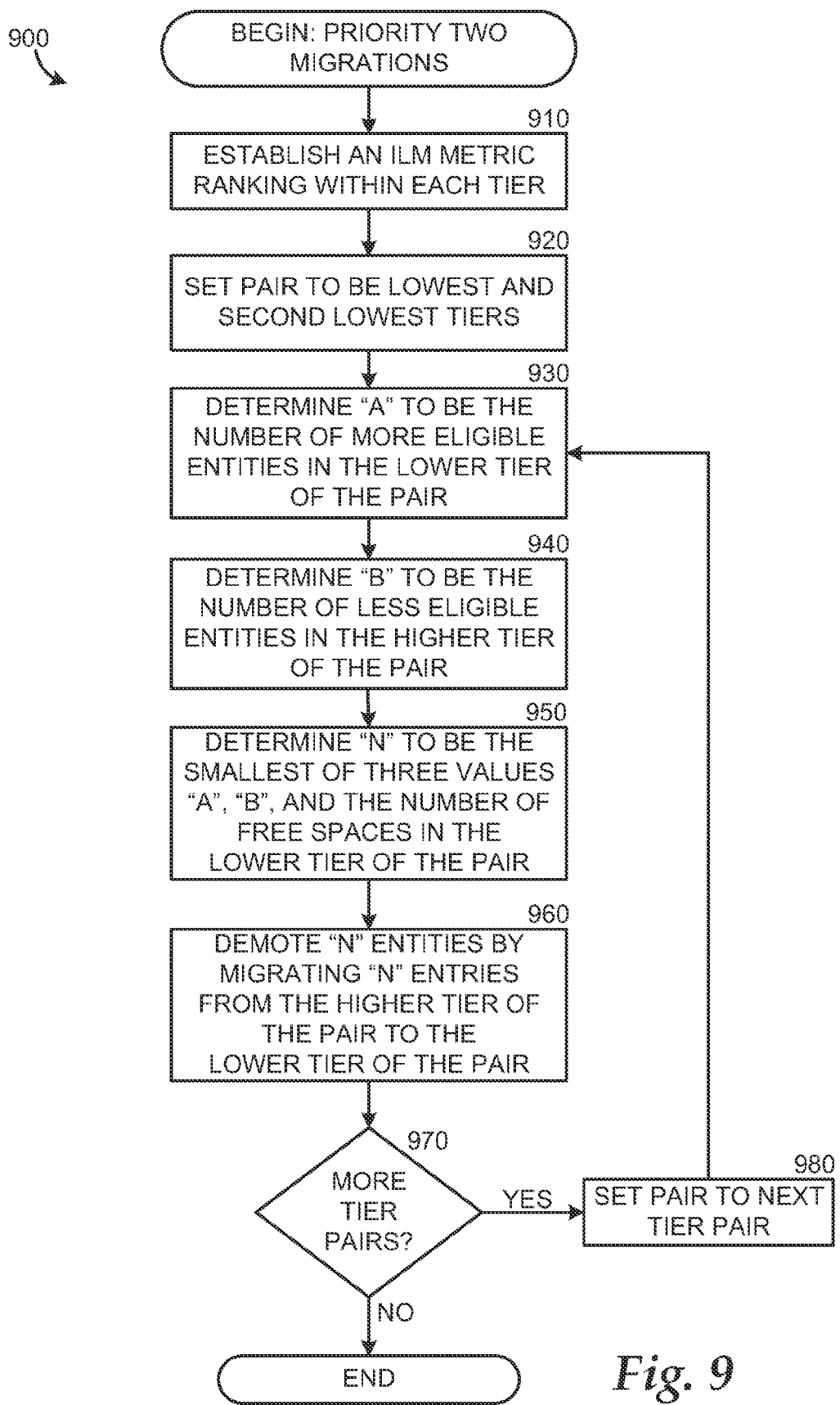
FIG. 9 is a logical flow diagram illustrating a process performed by a storage system for priority two data migrations according to one exemplary embodiment.

Turning now to FIG. 9, additional details will be provided regarding the embodiments presented herein for data migration in a multitier storage system using age and frequency statistics. In particular, FIG. 9 is a flow diagram illustrating a routine 900 that shows aspects of an exemplary process performed by a storage system for performing priority two data migrations. The routine 900 can begin with operation 910 where the territories within each tier are sorted by their ILM metric to provide a ranking of the territories within each tier by ILM metric. This sorting may be used to determine which territories of a given tier are more eligible than territories in the next higher tier or less eligible than the territories in the next lower tier.

At operation 920, a pair of tiers to evaluate is initialized as the two lowest tiers within the storage system. At operation 930, a value "A" is determined as the number of more eligible territories in the lower tier of the pair. The territories may have a higher ILM metric than the lowest ILM metric in the higher tier of the pair. At operation 940, a value "B" is determined as the number of less eligible territories in the higher tier of the pair. At operation 950, the values "A" and "B" can be examined to determine how many of the less eligible territories and more eligible territories match up for exchanging. The lower value of "A" and "B" is the highest number of territories that match up but the migration is also limited by the free space on the lower tier. Thus, a value "N" is determined as the minimum of three values, "A," "B," and the number of free territories in the lower tier of the pair.

At operation 960 a number of "N" territories are demoted from the higher tier of the pair to the lower tier of the pair. These demotions can create space in the higher tier for more eligible territories to be promoted into. Such promotions may occur as priority one migrations made during the next pass through the priority phases of data migration. Of course, the spaces created in the higher tier of the pair by the demotion process may be filled in by new territory allocations since new data is always placed in the highest available tier.

At operation 970 it can be determined if there are more pairs of neighboring tiers to be evaluated for migration. If there are more tiers, the routine 900 can proceed to operation 980 where the current pair of tiers to evaluate is advanced to the next pair of tiers. This pair advance can include setting the current higher tier to be the new lower tier and setting the tier above the current higher tier to be the new higher tier. From operation 980, the routine 900 can loop back to operation 930 where the newly advanced pair of tiers may be evaluated for possible demotion of territories as described above. If instead, it is determined at operation 970 that there are no more pairs of tiers to evaluate, the routine 900 can terminate.

Figure 10:
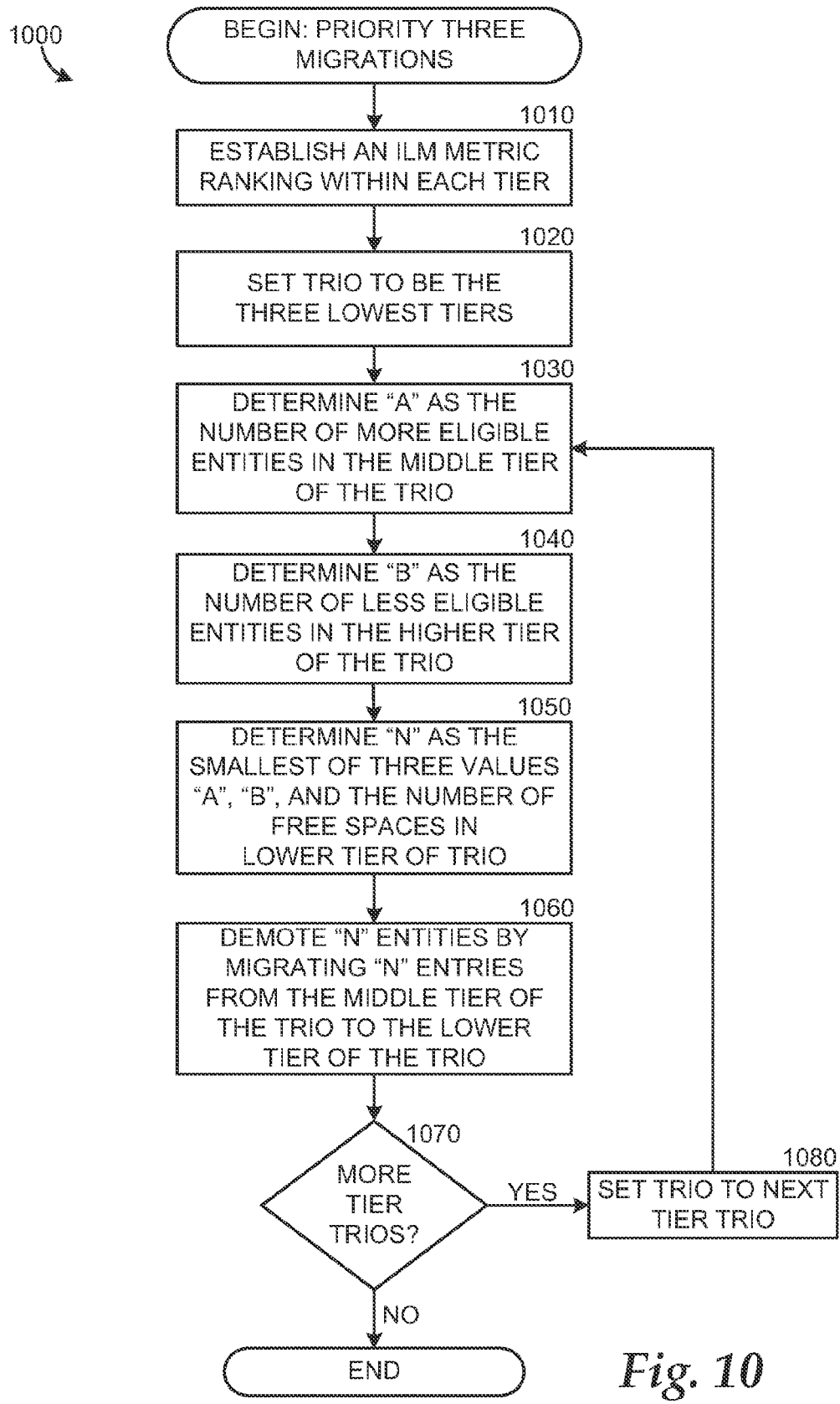
FIG. 10 is a logical flow diagram illustrating a process performed by a storage system for priority three data migrations according to one exemplary embodiment.

Turning now to FIG. 10, additional details will be provided regarding the embodiments presented herein for data migration in a multitier storage system using age and frequency statistics. In particular, FIG. 10 is a flow diagram illustrating a routine 1000 that shows aspects of an exemplary process performed by a storage system for performing priority three data migrations. The routine 1000 can begin with operation 1010 where the territories within each tier are sorted by their ILM metric to provide a ranking of the territories within each tier by ILM metric. This sorting may be used to determine which territories of a given tier are more eligible than territories in the next higher tier or less eligible than the territories in the next lower tier.

At operation 1020, a trio of tiers to evaluate is initialized as the three lowest tiers within the storage system. At operation 1030, a value "A" is determined as the number of more eligible territories in the middle tier of the trio. The territories may have a higher ILM metric than the lowest ILM metric in the higher tier of the trio. At operation 1040, a value "B" is determined as the number of less eligible territories in the higher tier of the trio. At operation 1050, the values "A" and "B" can be examined to determine how many of the less eligible territories and more eligible territories match up and thus would have been exchanged in priority two migration had it not been for a limitation of space in the middle tier of the trio. The lower value of "A" and "B" is the highest number of territories that match up but the migration is also limited by the free space on the lower tier of the trio. Thus, a value "N" is determined as the minimum of three values, "A," "B," and the number of free territories in the lower tier of the trio.

At operation 1060, a number of "N" territories are demoted from the middle tier of the trio to the lower tier of the trio. These demotions can create space in the middle tier for priority two exchanges to take place. Such exchanges may occur as priority two data migrations made during the next pass through the priority phases of data migration.

At operation 1070 it can be determined if there are more trios of neighboring tiers to be evaluated for migration. If there are more tiers, the routine 1000 can proceed to operation 1080 where the current trio of tiers to evaluate is advanced to the next trio of tiers. This trio advance can include setting the current higher tier to be the new middle tier, setting the tier above the current higher tier to be the new higher tier, and setting the current middle tier to be the new lower tier. From operation 1080, the routine 1000 can loop back to operation 1030 where the newly advanced trio of tiers may be evaluated for possible demotions as described above. If instead, it is determined at operation 1070 that there are no more trios of tiers to evaluate, the routine 1000 can terminate.

It will be appreciated that the above described behavior can comprise various types of default data migration behavior. In accordance with aspects of the subject matter described herein, default behavior can be modified by a user-specified policy as follows. As described above, each volume can be composed of territories, each territory corresponding to an 8 megabyte (MB) region of the volume. As described above, a value can be assigned to each territory for tracking the age of the data located in the territory. Similarly a value can be assigned to each territory for tracking the frequency with which the data is accessed. In accordance with embodiments described herein, a user can define a policy that overrides default migration behavior. The overriding data migration behavior can be based on the user-specified values. The user can define a policy that overrides the default behavior by demoting territories to the next lower tier when the territories are older than a user-specified age. If there is insufficient space to migrate the data to the next lower tier, the data can be migrated to the tier below the next lower tier and so on. Age can be specified as N days, weeks or months, where N is a user-configurable parameter.

Figure 12:
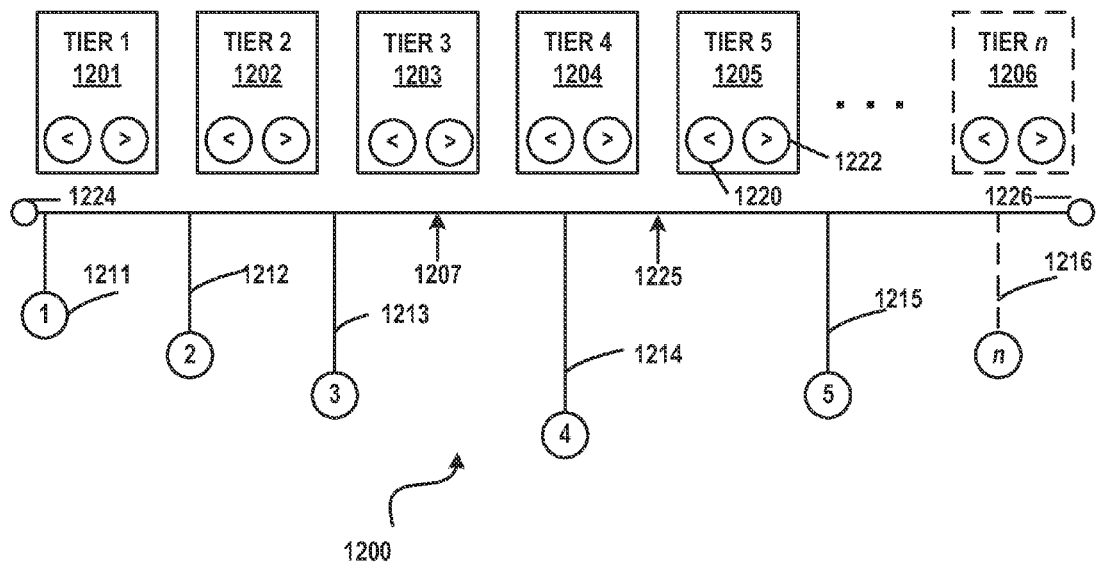
FIG. 12 illustrates an example of an implementation of a user interface 1200 for enabling user-specified age values modifying default demotion policy based on age according to one exemplary embodiment.

FIG. 12 illustrates an example of an implementation of a user interface 1200 for setting age values. The user-specified age values can be used to override a default age-based demotion policy. The number of tiers represented in the user interface can correspond with the number of tiers of the user's storage system. A storage system can include any number of tiers n. In FIG. 12 n tiers are shown, where n is some number greater than 5 but it will be appreciated that storage systems of any number, including a number less than 5 are contemplated. It will be appreciated that the number of tiers displayed in user interface 1200 can correspond with the number of tiers in the particular storage system being adjusted. In FIG. 12, the migration age for Tier 1 1201 can be adjusted using slider 1 1211, the migration age for Tier 2 1202 can be adjusted using slider 2 1212, the migration age for Tier 3 1203 can be adjusted using slider 1213, the migration age for Tier 4 1204 can be adjusted using slider 4 1214, the migration age for Tier 5 1205 can be adjusted using slider 5 1215 and so on to Tier n 1206. The migration age for Tier n 1206 can be adjusted using slider 1216.

Line 1207 represents a period of time. For example, the period of time spanned from point 1224 to point 1226 can be 4 years, 1 year, 1 month or any period of time. This period of time can be configured by the user or can be fixed. The period of time represented by sections of line 1207 can be expanded or contracted in one or more areas or equal length sections of any portion of line 1207 can represent fixed periods of time.

For example, a one inch section of line 1207 that starts at point 1224 may represent the same period of time as a one inch section of line 1207 that starts at point 1225. Alternatively, the one inch section of line 1207 that starts at point 1224 may represent a different period of time than does the one inch section of line 1207 that starts at point 1225.

Sliding the slider bar along line 1207 for each tier adjusts the period of time that data in the corresponding tier remains in the tier. For example, in FIG. 12, the position of slider 1 1211 along line 1207 may indicate that data migration of Tier 1 1201 data to Tier 2 1202 begins when tier 1 data is one day old. The position of slider 2 1212 may indicate that data in Tier 2 1202 is migrated to Tier 3 1203 when tier 2 data is 3 months, 1 week and 3 days old and so on. Backward arrow 1220 for each tier and forward arrow 1222 for each tier can fine-tune the age of data migration. For example, suppose the position of slider 5 1215 indicates that data in Tier 5 1205 is migrated to a lower tier when data is 1 year, 1 month and 5 days old. Pressing the forward arrow 1222 once may adjust the age of migration to 1 year, 1 month and 6 days old. Pressing and holding the forward arrow 1222 may advance the age of migration until the forward arrow 1222 is no longer depressed. Pressing the backward arrow 1220 can have similar but opposite effects. The backward and forward arrows can be repeatedly depressed until the desired age of migration is attained. It will be appreciated that reference numerals for backward and forward arrows for the other tiers are omitted for sake of readability. It will be appreciated that while FIG. 12 illustrates one example of enabling a user to set migration ages for tiers, other ways to enable the user to specify the migration age of a tier are contemplated.

The user can specify that demotion (migration of data in a tier to a lower tier) can start when the tier has reached a specified occupancy level. For example, the user can specify that demotion of territories can start when more that X percent of the tier is full, where X is a user-configurable parameter. The user can link the user-specified age policy and the user-specified percentage of occupancy policy so that demotion only occurs if both conditions are met.

Figure 13:
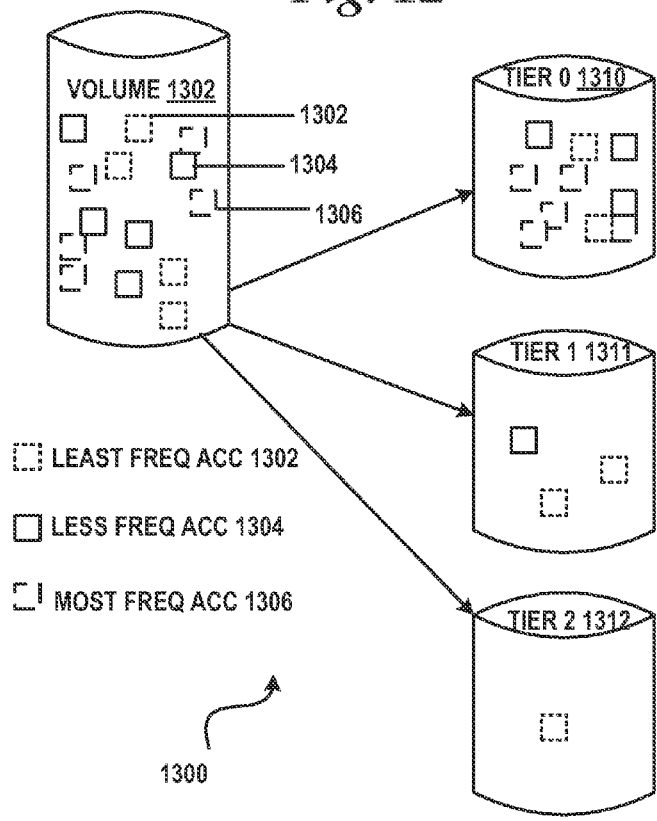
FIG. 13 illustrates an example of data spread based on default data migration policies according to one exemplary embodiment.

FIG. 13 illustrates an example 1300 of placement of data as may occur in the absence of a demotion policy. In FIG. 13 volume 1302 comprises three tiers, tier 0 1310, tier 1 1311 and tier 2 1312. Least frequently accessed data is represented by a finely hatched rectangle 1302, less frequently accessed data is represented by a solid rectangle 1304 and most frequently accessed data is represented by a broken rectangle 1306. In FIG. 13, it can be seen that Tier 0 1310 is the tier that is most fully occupied (approximately 75% full). Tier 0 1310 houses all of the most frequently accessed data 1306, approximately 60% of the less frequently accessed data 1304 and approximately 75% of the least frequently accessed data 1302. Tier 1 1311 houses little data being only about 20% full. Tier 1 1311 houses no frequently accessed data, approximately 40% of the least frequently accessed data 1302 and approximately 25% of the less frequently accessed data 1304. Tier 2 1312 is only about 5% full and houses about 25% of the least frequently used data. It will be appreciated that a more efficient use of space would concentrate most of the least frequently accessed data on the lowest tier (tier 2 1312 in the example), and would typically have a more equal distribution of space over the three tiers.

Figures 14, 15:
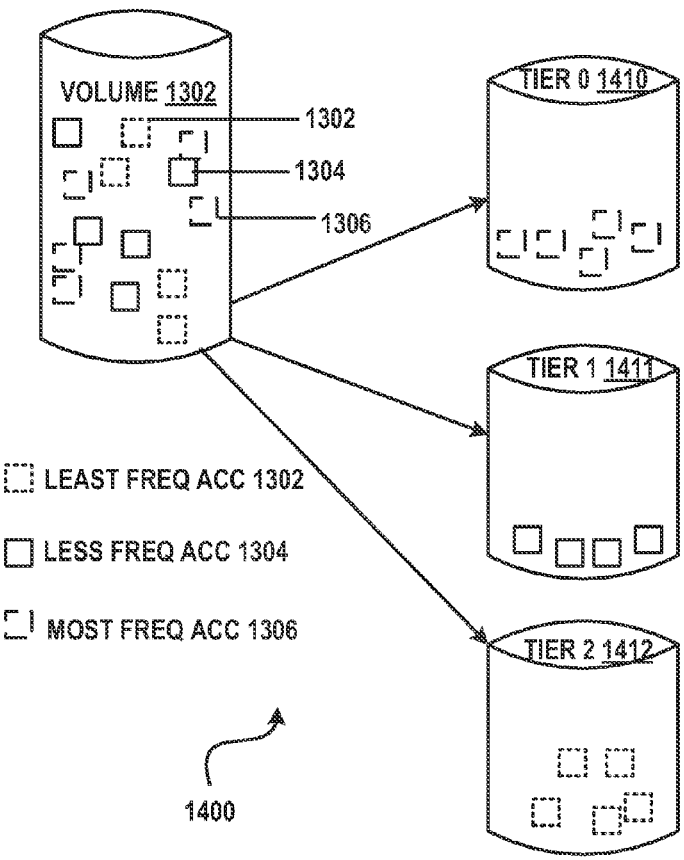
FIG. 14 illustrates an example of data spread when modified by user-specified demotion policies according to one exemplary embodiment.
FIG. 15 illustrates an example of a default tier age residency policy according to one exemplary embodiment.

FIG. 14 illustrates an example 1400 of the effect of a demotion policy on data placement of the data represented in FIG. 13. In FIG. 14 volume 1402 comprises three tiers, tier 0 1410, tier 1 1411 and tier 2 1412. FIG. 14 may represent a default demotion policy that stipulates that data in tier 0 is migrated to Tier 1 1411 when the data is older than one week old and the used-up capacity of the storage device is over 50%, that data in tier 1 1411 is migrated to tier 2 1412 when the data in tier 1 is older than one month old. It will be appreciated that the distribution of data in FIG. 14 is more efficient. The user in accordance with some embodiments can be given additional controls with which to further tune the default demotion policy. The default policy can be applied to volumes that do not have user-specified demotion policies as described above.

FIG. 15 illustrates an example of a default policy represented by a table 1500. In FIG. 15 the number of Age buckets (e.g., Bucket 0 1502, Bucket 1 1503, Bucket 2 1504, Bucket 3 1505 and Bucket 4 1506) is one greater than the number of tiers (e.g., Tier 0 1510, Tier 1 1511, Tier 2 1512 and Tier 3 1513). In FIG. 15, by default suppose Bucket 0 1502 represents free territories, Bucket 1 1503 represents territories that were recently accessed, Bucket 2 1504 represents territories that up to three weeks old, Bucket 3 1505 represents territories that are greater than 3 weeks and less than 4 months old and Bucket 4 1506 represent territories that are greater than 4 months old and less than 3 years old. Each tier has at least some space allocated for Bucket 0 data, Bucket 1 data, Bucket 2 data, Bucket 3 data and Bucket 4 data. Tier 0 1510 has 100 free territories in Bucket 0, represented by the "100" in table cell 1550. Tier 1 1511 has 150 free territories in Bucket 0, represented by the "150" in cell 1551. Tier 2 1512 has 200 free territories in Bucket 0, represented by the "200" in cell 1552. Tier 3 1513 has 100 free territories in Bucket 0, represented by the "100" in cell 1553.

Tier 0, the highest tier, typically represents the most expensive tier and typically holds the smallest amount of data while the lowest tier, tier 3 in FIG. 15, typically represents the least expensive tier and typically holds the greatest amount of data. Arrows 1560 and 1562 are demotion arrows that indicate how data is demoted and to which tier the data is demoted by default. Arrows 1564 are promotion arrows that indicate how data is promoted and to which tier the data is promoted by default.

The data that is present in territories represented by cells 1530, 1532, 1534, and 1536 is presumed in the example to be in the optimal tier for its age. The data that is present in Bucket 2 of Tier 0 (in cell 1538) is data that is three weeks old. It is unlikely that a user would want data that is that old to remain in the most expensive tier. Hence, in accordance with some embodiments default migration behavior demotes (moves to a lower tier) data in Bucket 2 to the optimal tier for data of this age, Tier 1. That is, the data in territories represented by cell 1538 is moved to cell 1532 as indicated by demotion arrow 1560. Hence, after the move, cell 1538 will contain no (zero) territories of data and cell 1532 will contain 50 territories of data, the 10 data territories moved from Tier 0, Bucket 2 to Tier 1, Bucket 2 plus the 40 territories that were already in cell 1532. Data in Bucket 3 Tier 0 (cell 1540) and in Bucket 3 Tier 1 (cell 1544) is older than 3 weeks and younger than 4 months old. In accordance with some embodiments default migration behavior demotes this data to cell 1534. Hence, after the move, cell 1534 would contain 455 territories, the 170 territories from cell 1540, and the 50 territories from cell 1544 added to the 235 territories already in cell 1534 as indicated by demotion arrows 1562. Similarly, the data in cells 1542, 1546 and 1548 would be added to the data already in cell 1536. (Demotion arrows omitted for purpose of figure clarity.)

In FIG. 15 120 territories of recently accessed data (Bucket 1 data) is located on Tier 2 in cell 1556. Because there are 100 free territories in Tier 0, (cell 1550), 100 territories can be moved from cell 1556 to cell 1530 and the remaining 20 territories of cell 1556 can be moved to cell 1554, as indicated by promotion arrows 1564. After this data promotion, cell 1530 has 130 territories, cell 1554 has 20 territories and cell 1556 has 0 territories.

Embodiments provide the user the opportunity to specify bucket ranges depending on desired data placement. For example, a user can specify that recently accessed data (Bucket 1 data) is data that has been accessed within the past day, the past 2 days, the past week or whatever period of time is suitable for the user's data. Similarly, Bucket 2 can be defined by the user to be data that has been accessed within the past two weeks. Similarly the user can define the age of data for Bucket 3 and Bucket 4. Such user-specified values override existing default behavior.

Storage volumes can comprise heterogenous tiers. For example, one volume can include SSD drives, SAS drives, and so on. Because tier proportions can vary over time, high value tier space can become limited, limiting access of other volumes to the high-value tier. Moreover, traditional striping of data is supposed to increase performance by increasing the number of spindles that serve a particular volume. However, performance may not be increased because performance is determined by the slowest tier of the volume participating in the striping.

A default migration policy can distribute data (territories) of a volume over higher and lower tiers depending on the age of the territory. Newer (more recently accessed) data can be placed in higher tiers and migrated to lower tiers as the data ages. In accordance with some embodiments a user can specify ratios or proportions in which data would inhabit each tier. Suppose for example, referring again to FIG. 15, that cell 1538 becomes full. Because new Tier 0 data coming in would not be able to reside on Tier 0 because of lack of space, the new data would have to be stored in Tier 1. To avoid this type of data placement, default migration behavior may start demotion of data when a tier reached a certain level of occupancy such as for example, when a tier reaches 50% occupancy. In this case, when a tier becomes 50% full, data in the tier is demoted to the next lower tier. Similarly, data in the next lower tier could be demoted one tier. In accordance with some embodiments, a user can specify the percentage occupancy (space used) that triggers the demotion process for each drive or type of drive. This can allow migration policy to adapt to different capacities of different types of storage devices.

In a typical server storage system, a number of thin clients can boot off a particular volume comprising three tiers, for example, Tier 0, Tier 1, and Tier 2. If data placement is not managed, two thin clients having the same operating system may experience widely different boot times because boot data for one thin client resides on a higher tier and boot data for the other data resides on a lower tier.

In a virtual machine environment in which virtual machines are created in each volume, the boot, application and registry data can be placed in the higher tiers because these elements are frequently accessed. The user data in the virtual machines can reside in the lower tier. Placing the boot, application and registry data in the higher tiers can result in a faster boot time and can ensure that the virtual machine will have access to high-tier space. For example, a default tier allocation may allocate for each client, 10% of his data to Tier 0, 50% to Tier 1 and 40% to Tier 2.

The ratio or percentage of occupancy can be based on the size of the volume or the size of the tiers. For example, the volume can have a size S, the three tiers can have sizes ST0, ST1 and ST2, respectively, and the ratios or percentages of occupancy can be X, Y and Z. When the ratio or percentage of occupancy is based on the size of the volume, X+Y+Z=100%. For example, if the volume is 10 GB, and the ratios or percentages of occupancy are 50%, 30% and 20%, then 5 GB of the volume can reside in tier ST0, 3 GB of the volume can reside in tier ST1 and 2 GB of the volume can reside in tier ST2. Alternatively, when the ratio or percentage of occupancy is based on the size of the tiers, X+Y+Z>100%. In this implementation, the ratios or percentages of occupancy are defined such that the volume of size S occupies no more than N % of each of the tiers. For example, the volume occupies no more than X % of tier ST0, Y % of tier ST1 and Z % of tier ST2. Accordingly, the lowest tier (i.e., tier ST2, for example) can accommodate 100% of the volume (i.e., Z=100%). In other words, the lowest tier can accommodate the entire volume. This may be desirable because the lower tier can include the inexpensive disks, which may have the largest capacities, and in accordance with demotion policies, the lowest tier can eventually accommodate the entire volume. In addition, the highest tier (i.e., tier ST0, for example), can initially accommodate all of the data, for example, when the size of the volume S is less than X %. This may be desirable because the highest tier may initially accommodate all of the new data, which may then be demoted to the lower tiers in accordance with demotion policies.

Figure 16:
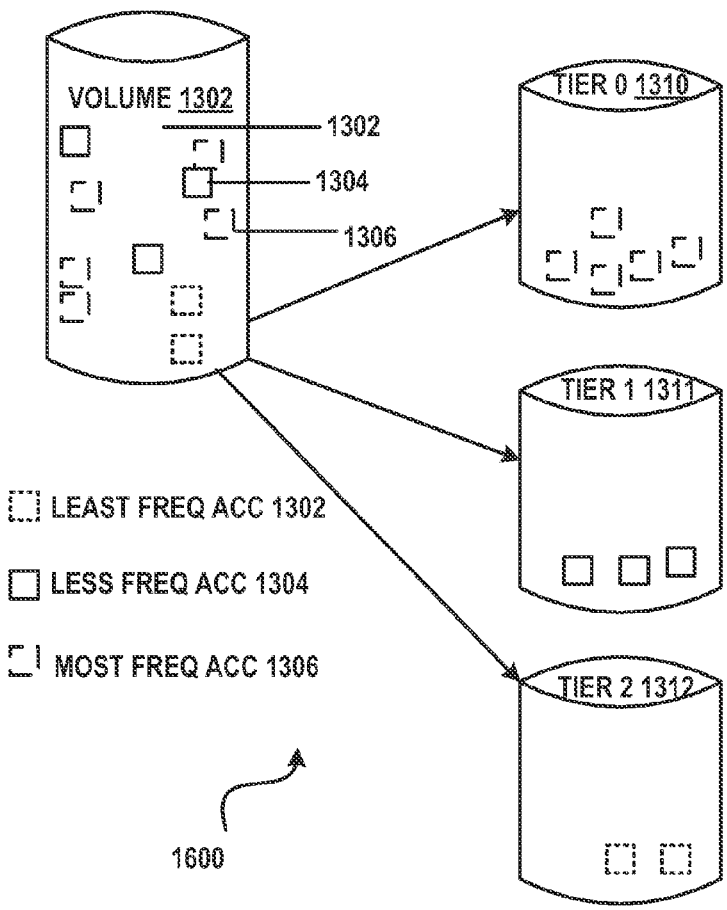
FIG. 16 illustrates a tier occupancy of a volume in a particular ratio according to one exemplary embodiment.

In accordance with some embodiments, a user can dedicate a volume's data to a user-specified tier. For example, data considered more important even though not frequently accessed can be placed in a higher tier than it would be placed by default migration policy based on frequency of access. The allocated proportions can be updated at any time, including at a point in time at which data migration would take place. In some embodiments data migration can be scheduled for a period of low activity. FIG. 16 system 1600 illustrates occupancy of a volume in the ratio 50:30:20 across 3 tiers.

Figure 17:
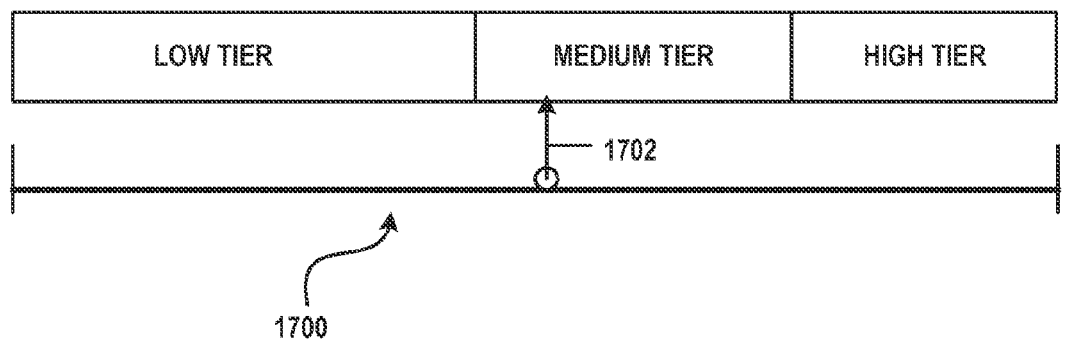
FIG. 17 illustrates an example of a sliding control that can assign a logical drive to a user-specified tier according to one exemplary embodiment.

Default policy for determining the tier to which a logical drive is assigned can be based on factors including the RAID level, the disk type, the number of drives and the number of spare drives. In accordance with some embodiments, a tier can be defined for each logical drive. This enables differentiation between tiers that default policy would assign to the same tier. FIG. 17 illustrates an example of a sliding control user interface 1700 that can be used to assign a logical drive to a user-specified tier, by moving arrow 1702.

In some embodiments a user is able to pause or resume from a pause the data migration for any particular container at any point in time during data migration.

Figure 11:
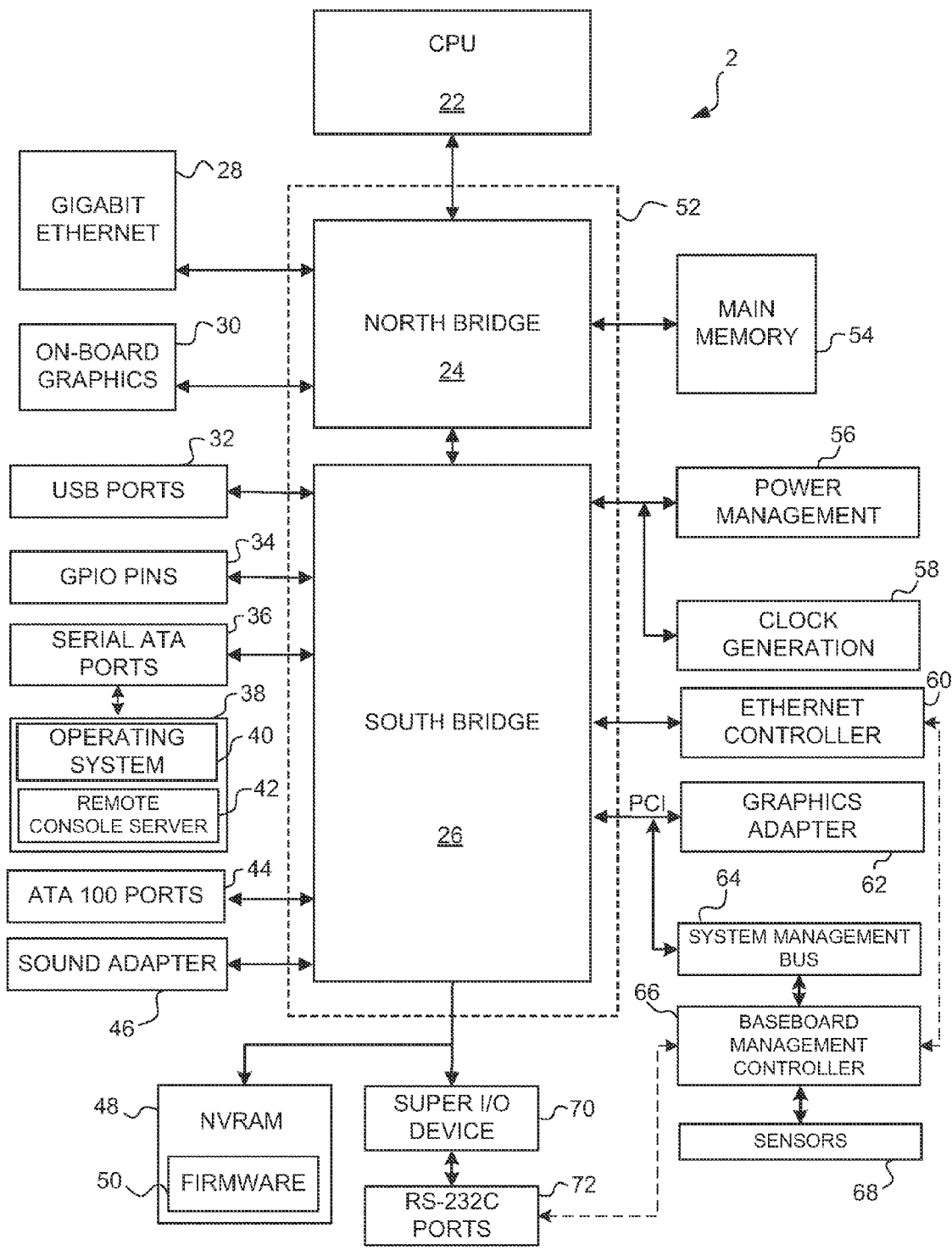
FIG. 11 is a computer architecture diagram illustrating a computer hardware architecture for a computing system capable of serving as a storage node according to one exemplary embodiment.

FIG. 11 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 11 shows an illustrative computer architecture for a storage node computer 2 that may be utilized in the implementations described herein. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 11, may include other components that are not explicitly shown in FIG. 11, or may utilize an architecture completely different than that shown in FIG. 11.

Based on the foregoing, it should be appreciated that technologies for implementing a migration mechanism in a storage system containing multiple tiers of storage with each tier having different cost and performance parameters are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method for migrating data between tiers of a storage system, the method comprising:
    subdividing a storage capacity of the storage system into a set of territories;
    partitioning the set of territories into a plurality of tiers, with each tier having different cost and performance parameters;
    imposing a hierarchy on the plurality of tiers;
    overriding a default migration policy by receiving a user-specified policy for data migration for a subset of the plurality of tiers, wherein the subset is less than the plurality of tiers, based at least on an age of data, the user-specified policy comprising respective values for user-specified migration ages and respective user-specified percentages of occupancy for each of the tiers that comprise the subset of tiers; and
    moving data from a current tier to a destination tier in the hierarchy, wherein at least the current tier belongs to the subset of tiers having a user-defined migration policy, based on the respective value for the user-specified migration age under the condition that an available capacity of the current tier exceeds the respective value for the user-specified percentage of occupancy.

2. The method of claim 1, wherein the data is stored in the current tier for a period of time greater than the respective value for the user-specified migration age prior to moving the data to the destination tier.

3. The method of claim 1, wherein the current tier is associated with greater performance characteristics than the destination tier.

4. The method of claim 1, further comprising storing new data in a highest tier of the hierarchy, the highest tier being associated with greater performance characteristics than other tiers in the hierarchy.

5. The method of claim 1, wherein the respective values for the user-specified percentages of occupancy are different for each of the tiers that comprise the subset of tiers, the respective values for the user-specified percentages of occupancy being associated with performance characteristics of each of the tiers that comprise the subset of tiers.

6. The method of claim 1, further comprising dedicating a type of data to a predetermined tier in the hierarchy, wherein the type of data is exempt from the user-specified policy for data migration based on an age of data.

7. The method of claim 6, wherein the type of data is boot data, application data or registry data.

8. A non-transitory computer-readable recording medium having computer-executable instructions stored thereon that, when executed by a computer, cause the computer to:
    subdivide a storage capacity of a storage system into a set of territories;
    partition the set of territories into a plurality of tiers, with each tier having different cost and performance parameters;
    impose a hierarchy on the plurality of tiers;
    override a default migration policy by receiving a user-specified policy for data migration for a subset of the plurality of tiers, wherein the subset is less than the plurality of tiers, based at least on an age of data, the user-specified policy comprising respective values for user-specified migration ages and respective user-specified percentages of occupancy for each of the tiers that comprise the subset of tiers; and
    move data from a current tier to a destination tier in the hierarchy, wherein at least the current tier belongs to the subset of tiers having a user-defined migration policy, based on the respective value for the user-specified migration age under the condition that an available capacity of the current tier exceeds the respective value for the user-specified percentage of occupancy.

9. The non-transitory computer-readable recording medium of claim 8, wherein the data is stored in the current tier for a period of time greater than the respective value for the user-specified migration age prior to moving the data to the destination tier.

10. The non-transitory computer-readable recording medium of claim 8, wherein the current tier is associated with greater performance characteristics than the destination tier.

11. The non-transitory computer-readable recording medium of claim 8, having further computer-executable instructions stored thereon that, when executed by the computer, cause the computer to store new data in a highest tier of the hierarchy, the highest tier being associated with greater performance characteristics than other tiers in the hierarchy.

12. The non-transitory computer-readable recording medium of claim 8, wherein the respective values for the user-specified percentages of occupancy are different for each of the tiers that comprise the subset of tiers, the respective values for the user-specified percentages of occupancy being associated with performance characteristics of each of the tiers that comprise the subset of tiers.

13. The non-transitory computer-readable recording medium of claim 8, having further computer-executable instructions stored thereon that, when executed by the computer, cause the computer to dedicate a type of data to a predetermined tier in the hierarchy, wherein the type of data is exempt from the user-specified policy for data migration based on an age of data.

14. The non-transitory computer-readable recording medium of claim 13, wherein the type of data is boot data, application data or registry data.

15. A data storage system, comprising:
    a storage node computer;
    a plurality of physical storage devices; and
    a data migration module configured to cause the storage node computer to:
        subdivide a storage capacity of the data storage system into a set of territories;

partition the set of territories into a plurality of tiers, with each tier having different cost and performance parameters;

impose a hierarchy on the plurality of tiers;

override a default migration policy by receiving a user-specified policy for data migration for a subset of the plurality of tiers, wherein the subset is less than the plurality of tiers, based at least on an age of data, the user-specified policy comprising respective values for user-specified migration ages and respective user-specified percentages of occupancy for each of the tiers that comprise the subset of tiers; and move data from a current tier to a destination tier in the hierarchy, wherein at least the current tier belongs to the subset of tiers having a user-defined migration policy, based on the respective value for the user-specified migration age under the condition that an available capacity of the current tier exceeds the respective value for the user-specified percentage of occupancy.

16. The data storage system of claim 15, wherein the data is stored in the current tier for a period of time greater than the respective value for the user-specified migration age prior to moving the data to the destination tier.

17. The data storage system of claim 15, wherein the current tier is associated with greater performance characteristics than the destination tier.

18. The data storage system of claim 15, wherein the data migration module is further configured to cause the storage node computer to store new data in a highest tier of the hierarchy, the highest tier being associated with greater performance characteristics than other tiers in the hierarchy.

19. The data storage system of claim 15, wherein the data migration module is further configured to cause the storage node computer to dedicate a type of data to a predetermined tier in the hierarchy, wherein the type of data is exempt from the user-specified policy for data migration based on an age of data.

20. The data storage system of claim 19, wherein the type of data is boot data, application data or registry data.

* * * * *